Oct. 9, 1923.
E. E. CHAPMAN
AUTO THEFT SIGNAL
Filed March 3, 1917
1,469,772
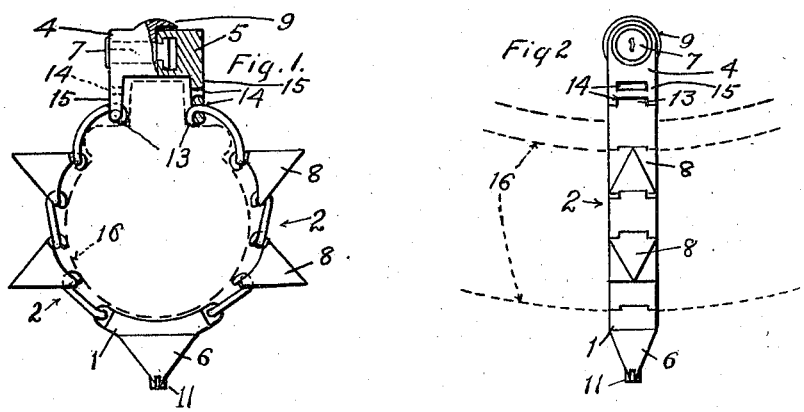
Inventor:
Earle E. Chapman
by Arthur P. Knight
his Attorney Patented Oct. 9, 1923.

1,469,772

UNITED STATES PATENT OFFICE.

EARLE E. CHAPMAN, OF LOS ANGELES, CALIFORNIA, ASSIGNOR TO MILLER-CHAPMAN COMPANY, OF LOS ANGELES, CALIFORNIA, A CORPORATION OF CALIFORNIA.

AUTO-THEFT SIGNAL.

Application filed March 3, 1917. Serial No. 152,213.

*To all whom it may concern:*

Be it known that I, EARLE E. CHAPMAN, a citizen of the United States of America, residing at Los Angeles, in the county of Los Angeles and State of California, have invented a new and useful Auto-Theft Signal, of which the following is a specification.

This invention relates to a flexible and adjustable device for attachment to a wheel of a vehicle, and adapted to serve as a preventive of theft of the same, by making a noise as the vehicle is moved, and by making a track or distinctive mark, enabling the vehicle to be traced.

The main object of the present invention is to make the protective device more adaptable than heretofore to the tire or wheel on which it is placed, so as to reduce the strain and wear on the parts while in use and so as to make the device available for use with wheel rims and tires of different size and shape.

The accompanying drawings illustrate embodiments of my invention, and referring thereto:

Fig. 1 is a front elevation of one form of my invention, partly in section.

Fig. 2 is a side elevation of said device.

My invention comprises a bumping member 1 and two chains 2 of hook links connected to the ends of said bumping member and to the two parts 4 and 5 of a locking clamp, which are fastened together by key-operated locking means 7. Said locking part 4 is provided with a flange 9 which overhangs the part 5, so as to cover the joint between said parts and prevent entrance of a picking tool, or of dirt. Bumping projection 6 on the bumping member 1 is provided with a die 11, adapted to leave a distinctive trace or track on the ground when the vehicle is moved. The uppermost or terminal links of the chains are connected to the clamp parts 4 and 5 by means providing for adjustment, for example, by hook portions 13 on said links engaging in any one of a plurality of slots 14 in lugs 15 on the respective parts 4 and 5. By placing the hooks 13 in one or the other of these slots, the chain may be lengthened or shortened as may be required to enable the device to fit with sufficient closeness around the tire and rim. If a greater amount of adjustment is required than can be furnished by this means, a link may be taken off or added to the chain at each side, the hook portions of the links being so shaped as to permit detachment of the links when the device is off of the tire, but to prevent such detachment when the device is in position on the tire. The attaching chain is also provided with auxiliary bumping projections, for example, in alternate links, as indicated at 8.

The device is placed around the tire and rim (indicated in dotted lines at 16) and secured in position by locking the parts 4 and 5 together. With the device so placed, any attempt to run the machine will result in impact of the bumping projection 6 on the pavement or roadway, causing sufficient noise to call attention to the fact that the machine is being moved wrongfully, and also causing an imprint or mark to be left on the roadway, which will facilitate tracing the machine.

In case it is attempted to render the device inoperative by deflating the tire so as to enable the chain to be turned around to another position, one or more of the other auxiliary bumping projections 8 will be brought into operative position, so as to still maintain the operativeness of the device and produce sufficient noise to give a notification that the machine is being moved by an unauthorized person. The flexibility of the device renders it adaptable to the shape of the tire when in operation, so that it will yield somewhat with the tire, and the strain on the machine and on the tire will be thereby reduced.

It will be apparent that there is an advantage in combining the adjustable and flexible features in the described device for the reason that flexibility involves more or less looseness and the adjustability provides for taking up the looseness. Similarly the plurality of auxiliary projections provides for bumping action even if the devices become twisted accidentally or intentionally.

What I claim is:

1. An automobile theft signal comprising: members adapted to enclose a tire; means for locking said members around a tire; and a series of bumping projections on said members extending outwardly therefrom, said projections being in such numbers and so spaced that one of them will be in a position to strike the ground and lift the wheel regardless of the transverse position of said members on said tire, so that the signal cannot be rendered ineffective by turning said members transversely around on the wheel.

2. An automobile theft signal comprising members fitting upon an automobile tire; means for locking said members on a tire; and a series of bumping projections on said members extending outwardly therefrom, said projections being in such numbers and so spaced that one of them will be in a position to strike the ground and lift the wheel regardless of the transverse position of said members on said tire, so that the signal cannot be rendered ineffective by turning said members transversely around on the wheel.

3. An automobile theft signal comprising; a structure fitting upon an automobile tire; means for so locking said structure that it cannot be removed from said tire; and means so formed on said structure as to strike the ground and lift the wheel, imparting a bumping motion thereto, regardless of the transverse position of said structure on said tire, so that said automobile theft signal cannot be rendered ineffective by turning said structure transversely around on said tire.

4. An automobile theft signal comprising; an articulated structure fitting upon an automobile tire; means for so locking said structure that it cannot be removed from said tire; and means so formed on said structure as to strike the ground and lift the wheel, imparting a bumping motion thereto, regardless of the transverse position of said structure on said tire, so that said automobile theft signal cannot be rendered ineffective by turning said structure transversely around on said tire.

5. An automobile theft signal comprising: a structure fitting upon an automobile tire; means for so locking said structure that it cannot be removed from said tire; and a series of bumping projections so formed on said structure as to strike the ground and lift the wheel, imparting a bumping motion thereto, regardless of the transverse position of said structure on said tire, so that said automobile theft signal cannot be rendered ineffective by turning said structure transversely around on said tire.

6. An automobile theft signal comprising: an articulated structure fitting upon an automobile tire; means for so locking said structure that it cannot be removed from said tire; and a series of bumping projections so formed on said structure as to strike the ground and lift the wheel, imparting a bumping motion thereto, regardless of the transverse position of said structure on said tire, so that said automobile theft signal cannot be rendered ineffective by turning said structure transversely around on said tire.

In testimony whereof I have hereunto set my hand, at Los Angeles, California, this 17th day of February, 1917.

EARLE E. CHAPMAN.